US009548687B2

(12) United States Patent
Feng (10) Patent No.: US 9,548,687 B2
(45) Date of Patent: Jan. 17, 2017

(54) METHOD OF ESTIMATING ROTATIONAL POSITION OF MOTOR, AND CONTROL APPARATUS OF MOTOR

(71) Applicants: Nidec Singapore PTE., Ltd., Singapore (SG); Nidec Corporation, Kyoto (JP)

(72) Inventor: Ju Feng, Singapore (SG)

(73) Assignees: NIDEC SINGAPORE PTE., LTD., Singapore (SG); NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/015,655

(22) Filed: Feb. 4, 2016

(65) Prior Publication Data

US 2016/0301337 A1  Oct. 13, 2016

(30) Foreign Application Priority Data

Apr. 10, 2015 (JP) ................................. 2015-081011

(51) Int. Cl.
*H02P 1/04* (2006.01)
*H02P 6/18* (2016.01)

(52) U.S. Cl.
CPC ..................... *H02P 6/183* (2013.01)

(58) Field of Classification Search
CPC ..................................................... H02P 6/183
(Continued)

(56) References Cited

U.S. PATENT DOCUMENTS 5,650,708 A * 7/1997 Sawada ............... B60L 11/1803
318/801
7,157,876 B2  1/2007 Ide et al.
(Continued)

FOREIGN PATENT DOCUMENTS

| JP | 2005-065452 A | 3/2005 |
|----|---------------|--------|
| JP | 2009-183034 A | 8/2009 |
| JP | 2009-254045 A | 10/2009 |

OTHER PUBLICATIONS

Shinnaka, "A New Speed-Varying Ellipse Voltage Injection Method for Sensorless Drive of Permanent-Magnet Synchronous Motors with Pole Saliency—New PLL Method Using High-Frequency Current Component Multiplied Signal", IEEE Transactions on Industry Applications, vol. 44, No. 3, May/Jun. 2008, pp. 777-788.

(Continued)

*Primary Examiner* — Erick Glass
(74) *Attorney, Agent, or Firm* — Keating & Bennett, LLP (57) ABSTRACT

A method of estimating a rotational position of a motor having saliency, the method including the steps of a) superimposing, on a drive voltage for the motor, a measuring voltage having a predetermined frequency higher than a frequency of the drive voltage to generate three-phase voltages, and supplying the three-phase voltages to a stationary portion of the motor; b) in parallel with step a), extracting components of the predetermined frequency in three-phase currents flowing in the stationary portion as first, second, and third extracted currents; c) multiplying the first and second extracted currents together to acquire a first composite signal, multiplying the second and third extracted currents together to acquire a second composite signal, and multiplying the first and third extracted currents together to acquire a third composite signal; d) subjecting the first, second, and third composite signals to low-pass filtering to acquire first, second, and third filtered signals, respectively, the low-pass filtering passing low-frequency components including the frequency of the drive voltage; and e) acquiring a rotational position of the rotating portion based on the first, second, and third filtered signals.

4 Claims, 6 Drawing Sheets (58) Field of Classification Search
USPC .................................................. 318/400.33
See application file for complete search history.

(56) References Cited

U.S. PATENT DOCUMENTS

| | | | |
|---|---|---|---|
| 7,190,130 B2 | 3/2007 | Wogari et al. | |
| 8,120,296 B2 | 2/2012 | Maekawa | |
| 8,536,812 B2 | 9/2013 | Maekawa | |
| 8,610,388 B2 | 12/2013 | Ito et al. | |
| 2008/0018273 A1* | 1/2008 | Kanamori | H02P 6/18 318/268 |
| 2010/0033064 A1* | 2/2010 | Tanaka | G01B 7/30 310/67 R |
| 2013/0049656 A1* | 2/2013 | Yasui | H02P 21/00 318/400.02 |

OTHER PUBLICATIONS

Corley et al., "Rotor Position and Velocity Estimation for a Salient-Pole Permanent Magnet Synchronous Machine at Standstill and High Speeds", IEEE Transactions on Industry Applications, vol. 34, No. 4, Jul./Aug. 1998, pp. 784-789.

* cited by examiner

METHOD OF ESTIMATING ROTATIONAL POSITION OF MOTOR, AND CONTROL APPARATUS OF MOTOR

BACKGROUND OF THE INVENTION

1. Field of the Invention

The present invention relates to a method of estimating a rotational position of a motor, and a control apparatus of a motor.

2. Description of the Related Art

Sensorless vector control, which eliminates use of a sensor for rotational position detection to reduce the number of wires in a motor, the size of the motor, and a production cost of the motor, has often been used. A high-frequency voltage injection method is known as a sensorless vector control technique. In the high-frequency voltage injection method, a voltage having a frequency higher than a frequency of a drive voltage for a motor is applied to the motor, and a rotational position (i.e., a phase) of the motor is estimated based on a response current.

For example, a paper by Shinnaka, S., "A new speed-varying ellipse voltage injection method for sensorless drive of permanent-magnet synchronous motors with pole saliency—New PLL method using high-frequency current component multiplied signal" (*IEEE Transactions* on Industry Applications, 44(3), 2008, pp. 777-788), is known. In a method described in this paper, a high-frequency voltage is generated in a γδ rotating reference frame. This voltage is transformed to a αβ stationary reference frame through Park transformation, and the resulting voltage is applied to a motor through space vector PWM and an inverter. Three-phase high-frequency currents flowing in the motor are extracted using band-pass filters, and are transformed to the γδ rotating reference frame. A γ-axis current and a δ-axis current are multiplied together, and the resulting signal is subjected to low-pass filtering to generate a signal of a single channel. This signal is used to estimate the rotational position of the motor through a PLL.

Further, a paper by Corley, M. J. and Lorenz, R. D., "Rotor position and velocity estimation for a salient-pole permanent magnet synchronous machine at standstill and high speeds" (*IEEE Transactions* on Industry Applications, 34(4), 1998, pp. 784-789), is known. In a method described in this paper, using response currents in a stationary reference frame and the sine and cosine of an estimated rotational position (i.e., angle), a signal representing a d-axis component of a high-frequency current is obtained. This signal is passed through a band-pass filter or the like to obtain an error signal representing a difference between the estimated rotational position and an actual rotational position. This error signal is inputted to an observer. The observer minimizes the error to track the rotational position.

In each of the above methods, a process requiring a high computational load, such as, for example, transformation between stationary and rotating reference frames, needs to be performed in an arithmetic portion. An increase in the computational load on the arithmetic portion may affect precision with which the rotational position of a rotating portion is sensed. Accordingly, there is a demand for a novel technique to precisely sense the rotational position of the rotating portion with a low computational load.

SUMMARY OF THE INVENTION

A method of estimating a rotational position of a motor having saliency according to a preferred embodiment of the present invention includes steps a), b), c), and d). In step a), on a drive voltage to rotate a rotating portion of the motor, a measuring voltage having a predetermined frequency higher than a frequency of the drive voltage is superimposed to generate three-phase voltages, and the three-phase voltages are supplied to a stationary portion of the motor. In step b), components of the predetermined frequency in three-phase currents flowing in the stationary portion are extracted as first, second, and third extracted currents in parallel with step a). In step c), the first and second extracted currents are multiplied together to acquire a first composite signal, the second and third extracted currents are multiplied together to acquire a second composite signal, and the first and third extracted currents are multiplied together to acquire a third composite signal. In step d), the first, second, and third composite signals are subjected to low-pass filtering to acquire first, second, and third filtered signals, respectively, the low-pass filtering passing low-frequency components including the frequency of the drive voltage. In step e), a rotational position of the rotating portion is acquired based on the first, second, and third filtered signals.

A control apparatus of a motor having saliency according to a preferred embodiment of the present invention includes a voltage supply section, a current extraction section, a composite signal acquisition section, and a rotational position acquisition section. The voltage supply section is arranged to superimpose, on a drive voltage to rotate a rotating portion of the motor, a measuring voltage having a predetermined frequency higher than a frequency of the drive voltage to generate three-phase voltages, and supply the three-phase voltages to a stationary portion of the motor. The current extraction section is arranged to extract components of the predetermined frequency in three-phase currents flowing in the stationary portion as first, second, and third extracted currents. The composite signal acquisition section is arranged to multiply the first and second extracted currents together to acquire a first composite signal, multiply the second and third extracted currents together to acquire a second composite signal, and multiply the first and third extracted currents together to acquire a third composite signal. The low-pass filtering section is arranged to subject the first, second, and third composite signals to low-pass filtering to acquire first, second, and third filtered signals, respectively, the low-pass filtering passing low-frequency components including the frequency of the drive voltage. The rotational position acquisition section is arranged to acquire a rotational position of the rotating portion based on the first, second, and third filtered signals. The voltage supply section is arranged to control a phase of the drive voltage based on the rotational position of the rotating portion.

According to preferred embodiments of the present invention, it is possible to precisely sense the rotational position of the rotating portion with a low computational load.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
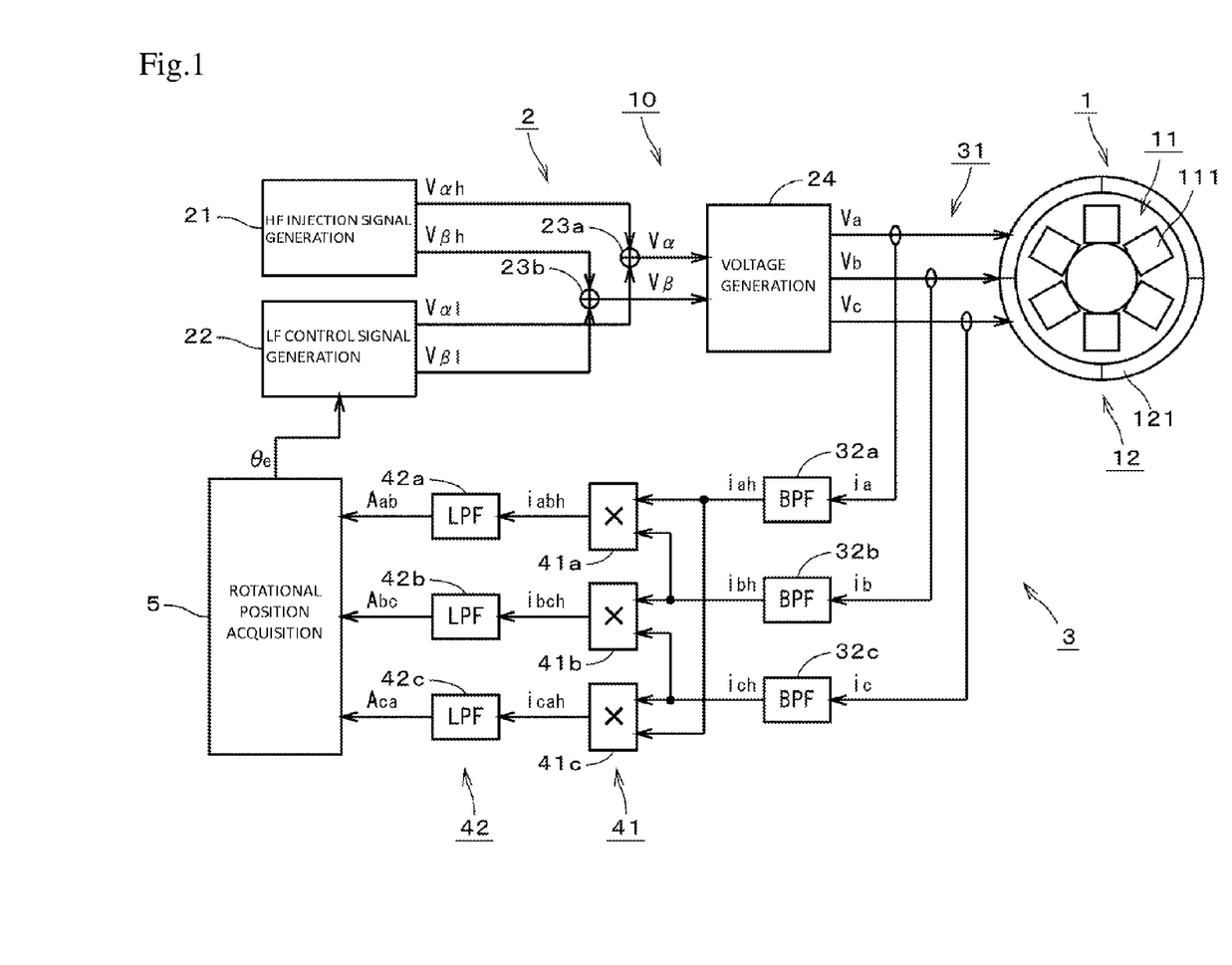
FIG. 1 is a diagram illustrating the structure of a control apparatus of a motor according to a first preferred embodiment of the present invention.

FIG. 1 is a diagram illustrating the structure of a control apparatus 10 of a motor 1 according to a first preferred embodiment of the present invention. Components of the control apparatus 10 are mounted on a circuit board of the motor 1, for example. Note that the control apparatus 10 may be provided separately from the circuit board (e.g., an inverter or the like). The motor 1 is, for example, a permanent-magnet synchronous motor, and has saliency. The motor 1 includes a stationary portion 11 and a rotating portion (i.e., a rotor) 12. The stationary portion 11 includes a stator 111. The rotating portion 12 includes a permanent magnet 121. The stationary portion 11 is arranged to rotatably support the rotating portion 12.

The control apparatus 10 includes a voltage supply section 2, a current extraction section 3, a composite signal acquisition section 41, a low-pass filtering section 42, and a rotational position acquisition section 5. A portion of the control apparatus 10 may be implemented via an arithmetic portion including software, for example. Accordingly, these components do not need to be provided as physically separate components. In other words, portions of the control apparatus 10 may be implemented in either software or hardware.

The voltage supply section 2 includes an HF injection signal generation section 21, an LF control signal generation section 22, two adders 23a and 23b, and a voltage generation section 24. The HF injection signal generation section 21 is arranged to generate a high-frequency injection signal which varies in an α-axis direction of an αβ reference frame, and a high-frequency injection signal which varies in a β-axis direction of the αβ reference frame. Hereinafter, the high-frequency injection signal will be referred to as an "HF injection signal". The HF injection signal is, for example, a sinusoidal signal. In FIG. 1, the HF injection signal for an α axis is denoted as "Vαh", whereas the HF injection signal for a β axis is denoted as "Vβh". Note that each of the HF injection signals Vαh and Vβh may alternatively be a signal having another waveform. Here, on the assumption that a reference frame in which currents flowing through three-phase stator windings are represented by vectors is an ABC reference frame, the αβ reference frame is a two-phase stationary reference frame obtained by subjecting the ABC reference frame to Clarke transformation. The α axis and the β axis are perpendicular to each other.

The LF control signal generation section 22 is arranged to generate low-frequency control signals for the α and β axes of the αβ reference frame. Hereinafter, the low-frequency control signal will be referred to as a "LF control signal". Each LF control signal is generated using various set values entered by a user, and input such as, for example, a rotational position of the rotating portion 12 acquired by the rotational position acquisition section 5. The LF control signal is a signal used to control rotation of the rotating portion 12. Generation of the LF control signal is based on an algorithm of vector control (Field Oriented Control (FOC)), direct torque control (DTC), PID control, six-step control, or the like. In FIG. 1, the LF control signal for the α axis is denoted as "Vαl", whereas the LF control signal for the β axis is denoted as "Vβl". The adder 23a superimposes the HF injection signal Vαh for the α axis on the LF control signal Vαl for the α axis, and outputs a resulting superimposed signal Vα for the α axis. The adder 23b superimposes the HF injection signal Vβh for the β axis on the LF control signal Vβl for the β axis, and outputs a resulting superimposed signal Vβ for the β axis.

The voltage generation section 24 includes, for example, a linear power amplifier capable of two- to three-phase transformation (i.e., αβ to ABC transformation), a space vector pulse width modulation (PWM) inverter, or the like. The two- to three-phase transformation transforms signals for the α and β axes into signals for A, B, and C axes each of which corresponds to a separate one of three-phase voltages to be supplied to the stationary portion 11. That is, the two- to three-phase transformation transforms signals in the αβ reference frame into signals in the ABC reference frame. The voltage generation section 24 supplies three-phase voltages Va, Vb, and Vc corresponding to the A, B, and C axes, respectively, to the stationary portion 11. The HF injection signal generation section 21, the LF control signal generation section 22, and the adders 23a and 23b can be regarded collectively as a voltage command generation section arranged to generate a voltage command as to the voltages to be supplied to the motor 1. The voltage generation section 24 supplies the voltages to the motor 1 based on the voltage command supplied from the voltage command generation section.

The current extraction section 3 includes a current signal acquisition unit 31 and three extractors 32a, 32b, and 32c. The current signal acquisition unit 31 is a so-called current sensor, and includes, for example, a shunt including an amplification circuit, a shunt resistor, a Hall effect current transducer, or the like. The current signal acquisition unit 31 is arranged to acquire three-phase currents ia, ib, and ic flowing in the stationary portion 11. Each of the extractors 32a to 32c includes, for example, a band-pass filter (BPF). The extractors 32a, 32b, and 32c are arranged to extract high-frequency (HF) components of the three-phase currents ia, ib, and ic as extracted currents iah, ibh, and ich for the A, B, and C axes, respectively.

The composite signal acquisition section 41 includes three multipliers 41a, 41b, and 41c. The multipliers 41a, 41b, and 41c are arranged to generate first, second, and third composite signals, respectively. The composite signals are used to acquire the rotational position as described below. The composite signals will be described in detail below. In FIG. 1, the first, second, and third composite signals are denoted as iabh, ibch, and icah, respectively. The low-pass filtering section 42 includes three low-pass filters (LPFs) 42a, 42b, and 42c. The low-pass filters 42a, 42b, and 42c are arranged to acquire first, second, and third filtered signals from the first, second, and third composite signals iabh, ibch, and icah, respectively. In FIG. 1, the first, second, and third filtered signals are denoted as Aab, Abc, and Aca, respectively. The extractors 32a to 32c, the multipliers 41a to 41c, and the low-pass filters 42a to 42c can be regarded collectively as a signal processing unit arranged to process the three-phase currents ia, ib, and is to generate the first, second, and third filtered signals Aab, Abc, and Aca. The filtered signals Aab, Abc, and Aca are position sensing signals used to acquire the rotational position of the rotating portion 12, which will be described below.

The rotational position acquisition section 5 is arranged to acquire the rotational position θe of the rotating portion 12 based on the first, second, and third filtered signals Aab, Abc, and Aca. The rotational position θe is used by the LF control signal generation section 22 to generate the LF control signals Vα1 and Vβ1. That is, control of rotation of the motor 1 is performed based on the rotational position θe.

Figure 2:
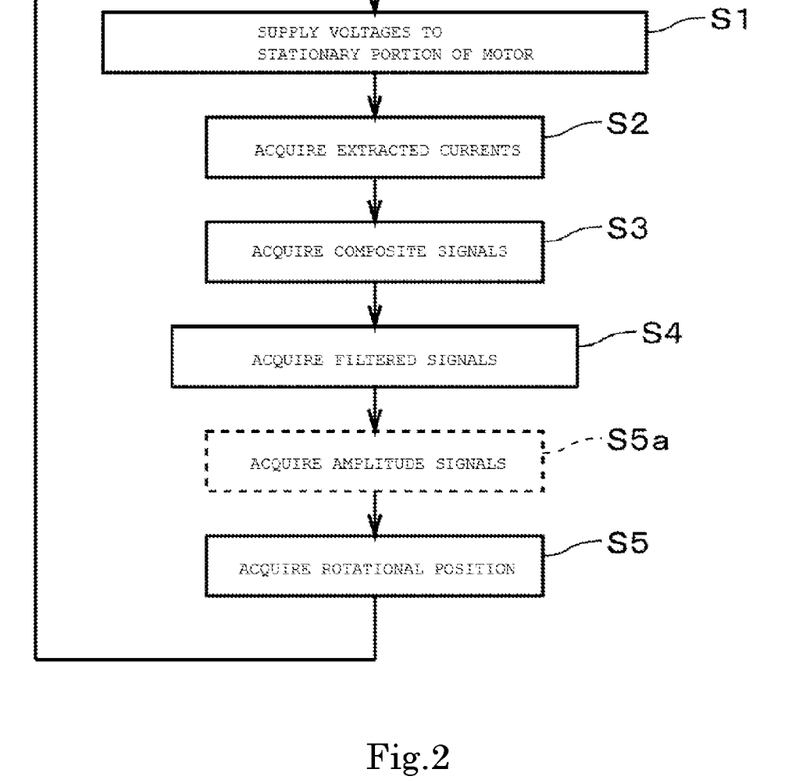
FIG. 2 is a flowchart illustrating a procedure performed by the control apparatus.

Next, processes performed by the control apparatus 10 while the motor 1 is in operation will now be described below with reference to FIG. 2. In the control apparatus 10, the processes illustrated in FIG. 2 are continuously repeated while the motor 1 is in operation. Processes related to various signals described below are, to be precise, processes related to values of those signals at a given time. Step S5a, which is indicated by a broken-line rectangle in FIG. 2 is a process performed in a second preferred embodiment of the present invention, which will be described below, and is not performed in the present preferred embodiment.

In the LF control signal generation section 22, the LF control signal Vα1 for the α axis and the LF control signal Vβ1 for the β axis are generated to rotate the rotating portion 12 of the motor 1. In the HF injection signal generation section 21, the HF injection signal Vαh for the α axis and the HF injection signal Vβh for the β axis are generated. Assuming that an angular frequency is denoted as ω, and time is denoted as t, the HF injection signal Vαh for the α axis and the HF injection signal Vβh for the β axis are expressed by Eq. 1 below.

$$\begin{cases} V_{\alpha h} = \cos(\omega t) \\ V_{\beta h} = \sin(\omega t) \end{cases} \quad \text{Eq. 1}$$

Figure 3:
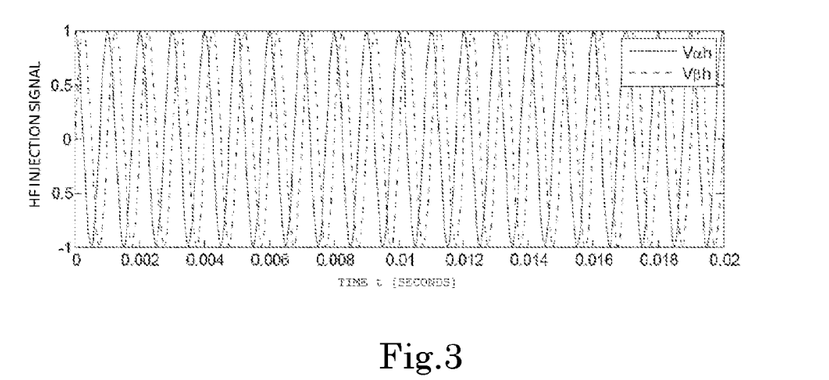
FIG. 3 is a graph illustrating HF injection signals.

FIG. 3 is a graph showing examples of the HF injection signals Vαh and Vβh. Each of the HF injection signals Vαh and Vβh has a frequency higher than a frequency of each of the LF control signals Vα1 and Vβ1. A look-up table may be created by previously measuring response values of the rotational position θe obtained in response to the HF injection signals Vαh and Vβh, so that a response value of the rotational position θe in response to the HF injection signals Vαh and Vβh at a given time can be acquired. The HF injection signal Vαh for the α axis is superimposed on the LF control signal Vα1 for the α axis to generate the superimposed signal Vα for the α axis. The HF injection signal Vβh for the β axis is superimposed on the LF control signal Vβ1 for the β axis to generate the superimposed signal Vβ for the β axis. In the voltage generation section 24, the three-phase voltages Va, Vb, and Vc are generated based on the superimposed signal vα for the α axis and the superimposed signal Vβ for the β axis.

Each of the voltages Va, Vb, and Vc includes a drive voltage ascribed to the LF control signals Vα1 and Vβ1, and a measuring voltage ascribed to the HF injection signals Vαh and Vβh. That is, each of the plurality of voltages Va, Vb, and Vc generated in the voltage supply section 2 is essentially a voltage in which the measuring voltage, which has a predetermined frequency higher than a frequency of the drive voltage, is superimposed on the drive voltage, which is used to rotate the rotating portion 12. The frequency of the measuring voltage is, for example, 20 kHz or less. The frequency of the measuring voltage is preferably in the range of about 500 Hz to about 1 kHz. The voltages Va, Vb, and Vc are supplied to the stationary portion 11 of the motor 1 (step S1). The supply of the voltages Va, Vb, and Vc to the stationary portion 11 is actually performed continuously, and steps S2, S3, and S4 described below are performed in parallel with step S1.

In the current signal acquisition unit 31, the three-phase currents ia, ib, and ic flowing in the stationary portion 11 are acquired. In the extractors 32a, 32b, and 32c, frequency components of the HF injection signals Vαh and Vβh in the three-phase currents ia, ib, and ic are extracted as the extracted currents iah, ibh, and ich for the A, B, and C axes, respectively (step S2). Hereinafter, the extracted currents iah, ibh, and ich for the A, B, and C axes will be referred to as first, second, and third extracted currents iah, ibh, and ich, respectively. Thus, in the current extraction section 3, frequency components of the measuring voltages in the three-phase currents ia, ib, and ic flowing in the stationary portion are extracted as the first, second, and third extracted currents iah, ibh, and ich.

Figure 4:
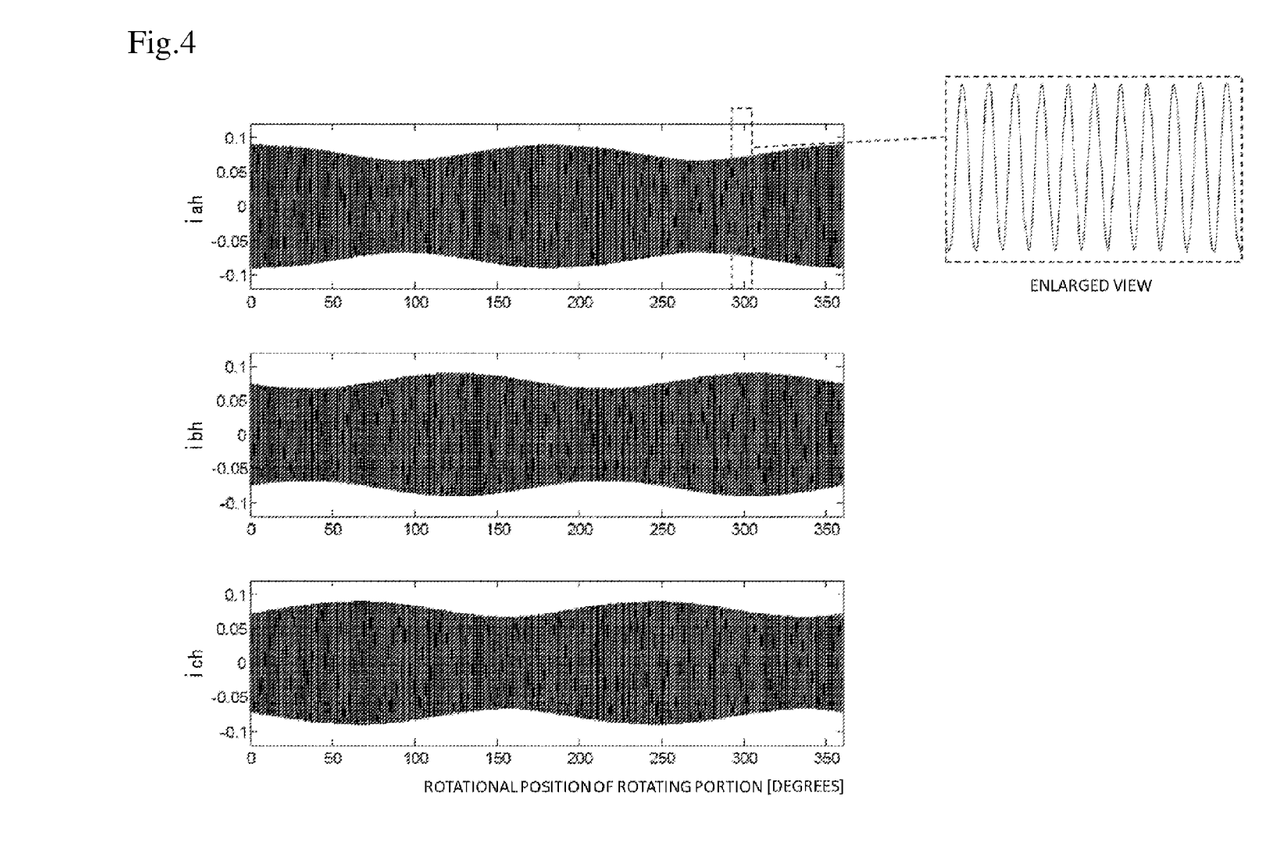
FIG. 4 shows graphs illustrating extracted currents.

FIG. 4 shows graphs showing the first, second, and third extracted currents iah, ibh, and ich. In FIG. 4, a vertical axis represents the value of each of the extracted currents iah, ibh, and ich, whereas a horizontal axis represents the rotational position of the rotating portion 12. As shown in FIG. 4, the amplitude of each of the extracted currents iah, ibh, and ich varies depending on the rotational position of the rotating portion 12. That is, an amplitude profile, which represents a change in the amplitude of each of the extracted currents iah, ibh, and ich, is a function of the rotational position of the rotating portion 12. Assuming that the amplitude profiles of the extracted currents iah, ibh, and ich are denoted as Aa, Ab, and Ac, respectively, the extracted currents iah, ibh, and ich are expressed by Eq. 2 below. Note that, in Eq. 2, the amplitude profiles, which are functions of the rotational position θe of the rotating portion 12, are denoted as Aa(θe), Ab(θe), and Ac(θe), and the extracted currents, which are functions of time, are denoted as iah(t), ibh(t), and ich(t). This also applies to Eqs. 3, 4, 5, and 6 presented below.

$$\begin{Bmatrix} i_{ah}(t) \\ i_{bh}(t) \\ i_{ch}(t) \end{Bmatrix} = \begin{Bmatrix} A_a(\theta_e) \cdot \cos(\omega t) \\ A_b(\theta_e) \cdot \cos\left(\omega t - \dfrac{2\pi}{3}\right) \\ A_c(\theta_e) \cdot \cos\left(\omega t - \dfrac{4\pi}{3}\right) \end{Bmatrix} \quad \text{Eq. 2}$$

In the composite signal acquisition section 41, the first, second, and third composite signals iabh, ibch, and icah are generated according to Eq. 3 below (step S3). Specifically, in the multiplier 41a, the first extracted current iah and the second extracted current ibh are multiplied together to generate the first composite signal iabh. In the multiplier 41b, the second extracted current ibh and the third extracted current ich are multiplied together to generate the second composite signal ibch. In the multiplier 41c, the third extracted current ich and the first extracted current iah are multiplied together to generate the third composite signal icah.

$$\begin{Bmatrix} i_{abh}(t) \\ i_{bch}(t) \\ i_{cah}(t) \end{Bmatrix} = \begin{Bmatrix} i_{ah}(t) \cdot i_{bh}(t) \\ i_{bh}(t) \cdot i_{ch}(t) \\ i_{ch}(t) \cdot i_{ah}(t) \end{Bmatrix} \quad \text{Eq. 3}$$

-continued $$= \left\{ \begin{array}{l} A_a(\theta_e) \cdot \cos(\omega t) \cdot A_b(\theta_e) \cdot \cos\left(\omega t - \frac{2\pi}{3}\right) \\ A_b(\theta_e) \cdot \cos\left(\omega t - \frac{2\pi}{3}\right) \cdot A_c(\theta_e) \cdot \cos\left(\omega t - \frac{4\pi}{3}\right) \\ A_c(\theta_e) \cdot \cos\left(\omega t - \frac{4\pi}{3}\right) \cdot A_a(\theta_e) \cdot \cos(\omega t) \end{array} \right\}$$

$$= \left\{ \begin{array}{l} -\frac{1}{4}A_a(\theta_e)A_b(\theta_e) + \frac{1}{2}A_a(\theta_e)A_b(\theta_e)\cos\left(2\omega t - \frac{2\pi}{3}\right) \\ -\frac{1}{4}A_b(\theta_e)A_c(\theta_e) + \frac{1}{2}A_b(\theta_e)A_c(\theta_e)\cos(2\omega t) \\ -\frac{1}{4}A_c(\theta_e)A_a(\theta_e) + \frac{1}{2}A_c(\theta_e)A_a(\theta_e)\cos\left(2\omega t - \frac{4\pi}{3}\right) \end{array} \right\}$$

Here, it is apparent from the derivation of the equation in Eq. 3 that each of the composite signals iabh, ibch, and icah is the sum of a low-frequency term and a high-frequency term. The low-frequency term depends on the rotational position θe of the rotating portion 12. The high-frequency term is a function of the frequency of each of the HF injection signals Vαh and Vβh. As expressed in Eq. 4 below, the low-frequency terms of the first, second, and third composite signals iabh, ibch, and icah can be acquired as the first, second, and third filtered signals Aab, Abc, and Aca, respectively, as a result of subjecting the first, second, and third composite signals iabh, ibch, and icah to low-pass filtering.

$$\left\{ \begin{array}{l} A_{ab}(\theta_e) \\ A_{bc}(\theta_e) \\ A_{ca}(\theta_e) \end{array} \right\} = LPF \left[ \begin{array}{l} i_{abh}(t) \\ i_{bch}(t) \\ i_{cah}(t) \end{array} \right] \quad \text{Eq. 4}$$

$$= \left\{ \begin{array}{l} -\frac{1}{4}A_a(\theta_e)A_b(\theta_e) \\ -\frac{1}{4}A_b(\theta_e)A_c(\theta_e) \\ -\frac{1}{4}A_c(\theta_e)A_a(\theta_e) \end{array} \right\}$$

where LPF[·] represents low-pass filtering

Figure 5:
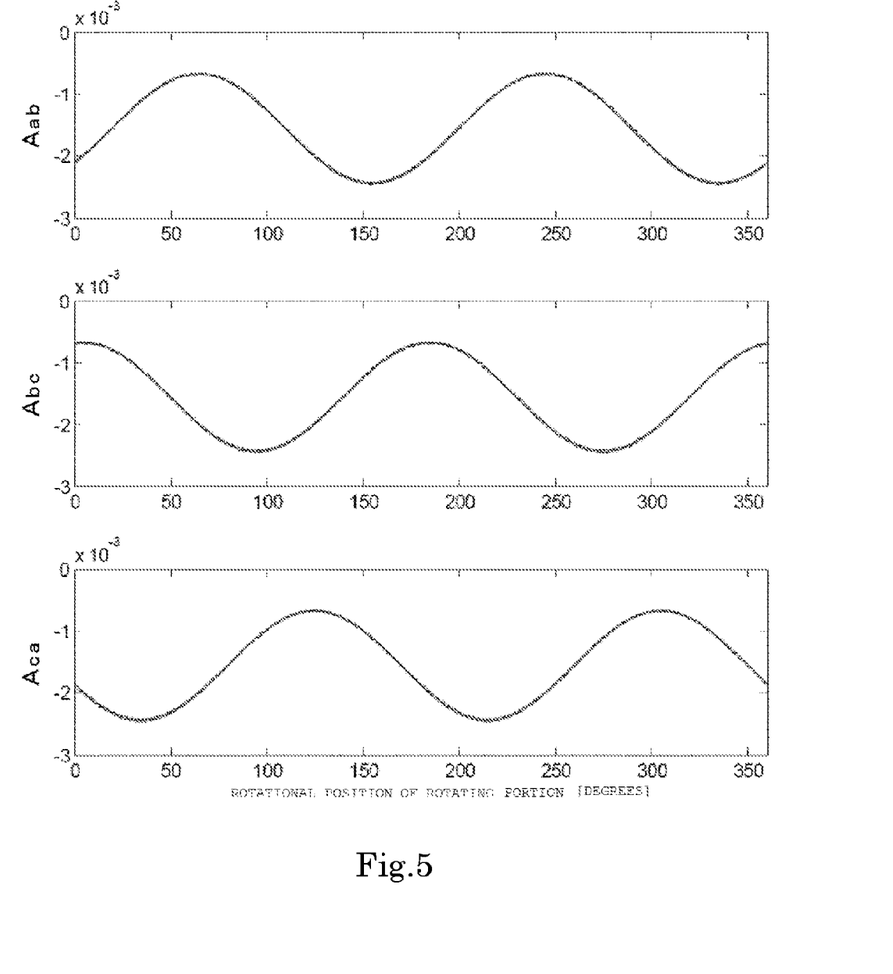
FIG. 5 shows graphs illustrating filtered signals.

In practice, the first, second, and third filtered signals Aab, Abc, and Aca are acquired through the low-pass filtering in the low-pass filters 42a, 42b, and 42c, respectively (step S4). A cutoff frequency of each of the low-pass filters 42a to 42c is an arbitrary frequency lower than the frequency of each of the HF injection signals Vαh and Vβh, i.e., the frequency of the measuring voltage. The cutoff frequency is, for example, a frequency equal to or greater than twice the frequency of the drive voltage. The low-pass filtering passes low-frequency components including the frequency of the drive voltage. In FIG. 5, variations of the first, second, and third filtered signals Aab, Abc, and Aca with the rotational position of the rotating portion 12 are shown. Each of the filtered signals Aab, Abc, and Aca is a function of the rotational position θe. The first, second, and third filtered signals Aab, Abc, and Aca are usable to calculate the rotational position θe of the motor 1 having saliency. The first, second, and third filtered signals Aab, Abc, and Aca are inputted to the rotational position acquisition section 5.

Figure 6:
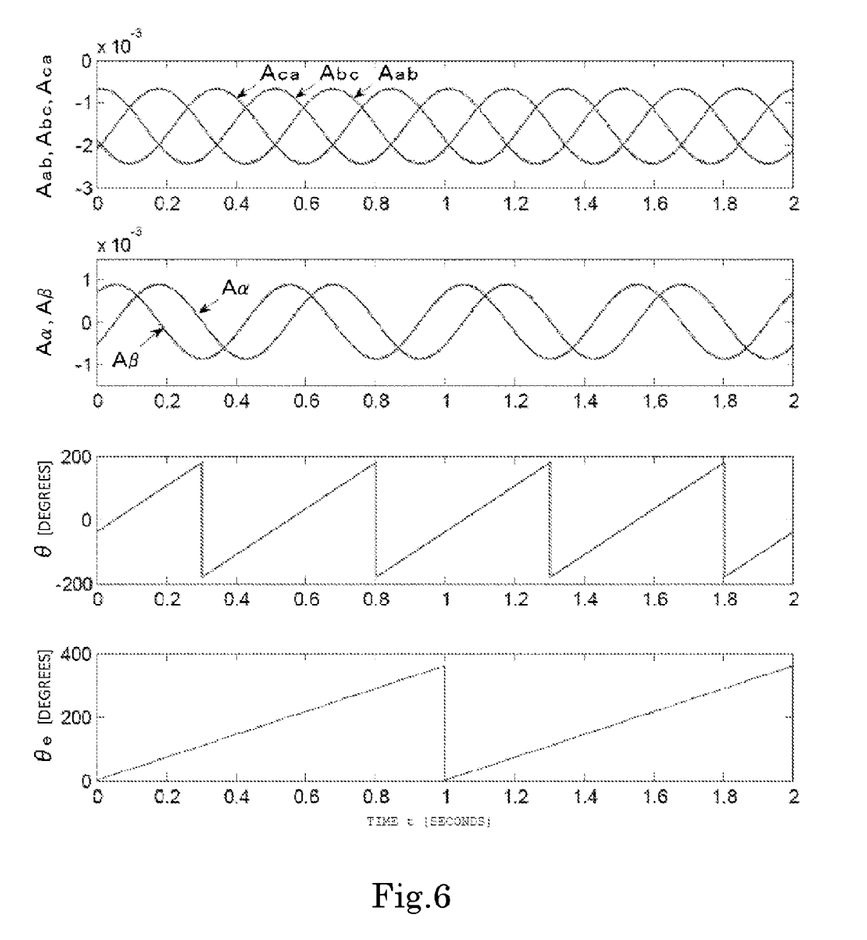
FIG. 6 shows graphs illustrating signals obtained in a rotational position acquisition section according to the first preferred embodiment of the present invention.

FIG. 6 shows graphs showing signals obtained in the rotational position acquisition section 5. The graph at the top in FIG. 6 illustrates the first, second, and third filtered signals Aab, Abc, and Aca. The second graph from the top in FIG. 6 illustrates a filtered signal Aα for the α axis and a filtered signal Aβ for the β axis, which will be described below, and the third graph from the top in FIG. 6 illustrates an angle θ, which will also be described below. The graph at the bottom in FIG. 6 illustrates the rotational position θe.

In the rotational position acquisition section 5, the first, second, and third filtered signals Aab, Abc, and Aca are signals for the A, B, and C axes. The first, second, and third filtered signals Aab, Abc, and Aca are subjected to Clarke transformation, which is three- to two-phase transformation (i.e., ABC to αβ transformation). As a result, the filtered signal Aα for the α axis and the filtered signal Aβ for the β axis as illustrated in the second graph from the top in FIG. 6 are obtained. Next, using the filtered signal Aα for the α axis and the filtered signal Aβ for the β axis, an arctangent function, atan2(Aα, Aβ), is obtained as the angle θ (see the third graph from the top in FIG. 6). In other words, the angle θ, which is an angle between the β axis and a vector from the origin to a point having an α value of Aα and a β value of Aβ in the αβ reference frame, is obtained. Then, the angle θ is offset by a specified angle to be adjusted to 0 degrees of the rotational position θe of the rotating portion 12.

Here, as shown in FIG. 4, the amplitude profile of each extracted current undergoes two cycles of variation during one rotation of the rotating portion 12, i.e., from 0 degrees to 360 degrees of the rotational position of the rotating portion 12. Accordingly, a value of the above angle θ offset by an angle within the range of 0 degrees to 720 degrees divided by two is acquired as the rotational position θe of the rotating portion 12 as illustrated in the graph at the bottom in FIG. 6 (step S5). In the rotational position acquisition section 5, the rotational position θe of the motor 1 is estimated based on the filtered signals Aab, Abc, and Aca in the above-described manner.

While the motor 1 is in operation, the above-described steps S1 to S5 are performed repeatedly. As mentioned above, in each of steps S1 to S5, to be precise, values of the signals at a given time are dealt with. Here, in the generation of the three-phase voltages Va, Vb, and Vc in step S1, values of the LF control signals Vα1 and Vβ1 are generated based on a value of the rotational position θe of the rotating portion 12 acquired in a previous iteration of step S5, and the set values, such as, for example, a rotational speed. That is, phases of the drive voltages for the motor 1 are controlled based on the rotational position θe of the rotating portion 12. Thus, the rotation of the motor 1 can be controlled with high precision.

As described above, in the control apparatus 10 of the motor 1, on each drive voltage used to rotate the rotating portion 12, the measuring voltage having a frequency higher than the frequency of the drive voltage is superimposed to generate the three-phase voltages, and the three-phase voltages are supplied to the stationary portion 11. The frequency components of the measuring voltages in the three-phase currents flowing in the stationary portion 11 are extracted as the first, second, and third extracted currents. Two extracted currents in every pair of the first, second, and third extracted currents are multiplied together to acquire the first, second, and third composite signals. The first, second, and third composite signals are subjected to the low-pass filtering to acquire the first, second, and third filtered signals. The rotational position of the rotating portion 12 is acquired based on the first, second, and third filtered signals. The rotational position of the rotating portion 12 can thus be acquired with high precision. Moreover, the phases of the drive voltages for the motor 1 are controlled based on the rotational position of the rotating portion 12. This allows the motor 1 to rotate with high precision.

In the control apparatus 10, each of addition of the measuring voltage and signal processing related to the extracted currents is performed in the stationary reference frame. This eliminates the need to perform complicated transformation or the like between stationary and rotating reference frames as required in the aforementioned method proposed by Shinnaka, S. and the aforementioned method proposed by Corley, M. J. et al., allowing acquisition of the rotational position with a low computational load.

In addition, the method proposed by Shinnaka, S. and the method proposed by Corley, M. J. et al have problems in that, in a low-speed operation, induced voltages are not generated, making a rotation direction unclear, and a high degree of precision cannot be achieved. Accordingly, an observer or a PLL is required to achieve highly precise detection of the rotational position, which leads to an increase in a computational load. In view of this, the control apparatus 10 is able to achieve a reduction in the computational load in the low-speed operation.

Figure 7:
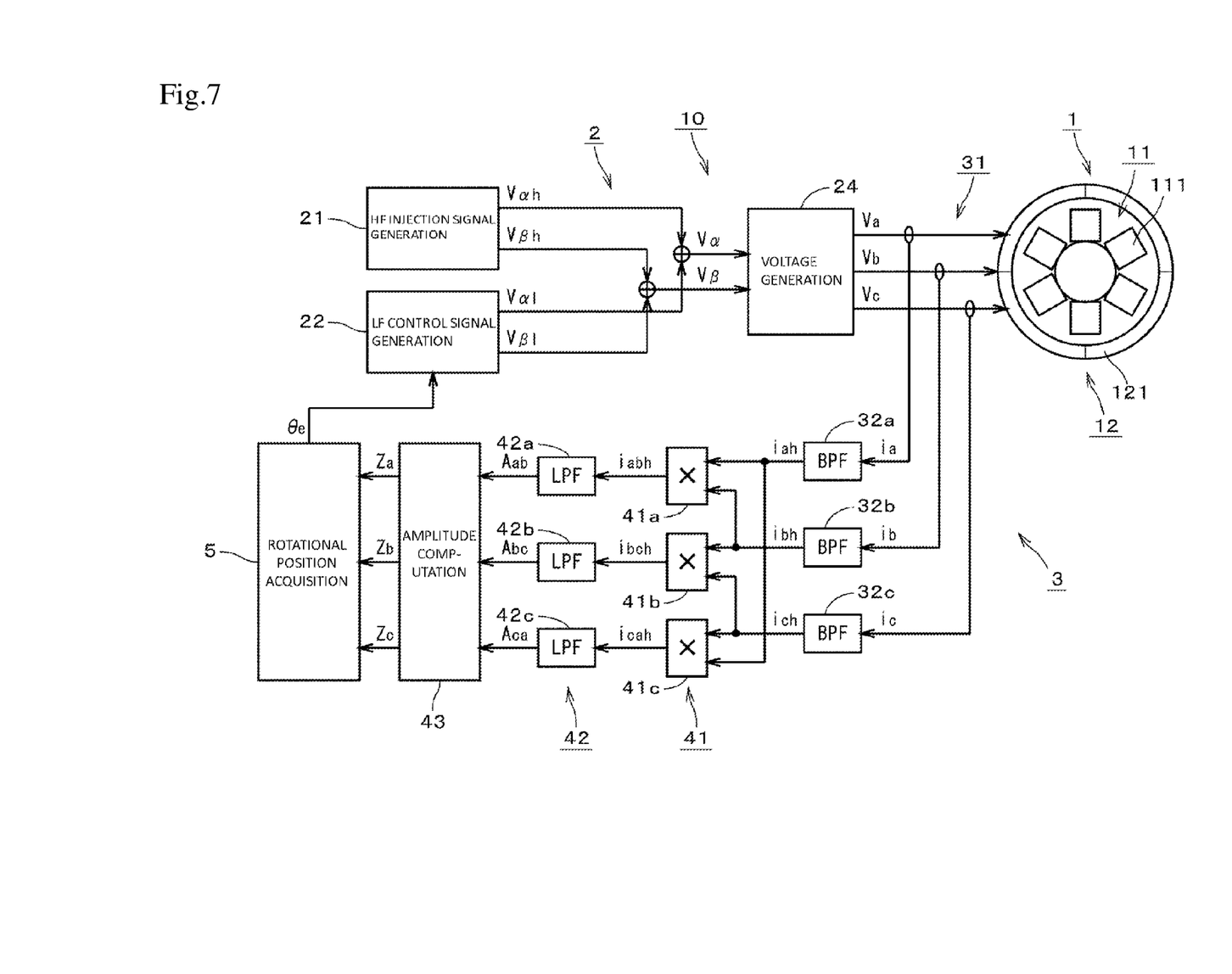
FIG. 7 is a diagram illustrating the structure of a control apparatus of a motor according to a second preferred embodiment of the present invention.

FIG. 7 is a diagram illustrating the structure of a control apparatus 10 of a motor 1 according to the second preferred embodiment of the present invention. The control apparatus 10 illustrated in FIG. 7 is different from the control apparatus 10 illustrated in FIG. 1 in that an amplitude computation section 43 is additionally provided between a low-pass filtering section 42 and a rotational position acquisition section 5. The control apparatus 10 according to the second preferred embodiment is otherwise similar in structure to the control apparatus 10 illustrated in FIG. 1, and accordingly, like members or portions are designated by like reference numerals.

In the control apparatus 10 illustrated in FIG. 7, as in the first preferred embodiment, voltages Va, Vb, and Vc are supplied to a stationary portion 11 of the motor 1 (step S1 in FIG. 2). Further, first, second, and third composite signals iabh, ibch, and icah are generated from first, second, and third extracted currents iah, ibh, and ich, and first, second, and third filtered signals Aab, Abc, and Aca are acquired from the first, second, and third composite signals iabh, ibch, and icah, respectively (steps S2 to S4). The first, second, and third filtered signals Aab, Abc, and Aca are inputted to the amplitude computation section 43.

The amplitude computation section 43 is arranged to acquire a first amplitude signal Za, a second amplitude signal Zb, and a third amplitude signal Zc using the first, second, and third filtered signals Aab, Abc, and Aca and Eq. 5 below (step S5a).

$$\begin{Bmatrix} Z_a \\ Z_b \\ Z_c \end{Bmatrix} = \begin{Bmatrix} 2\sqrt{-\dfrac{A_{ca}(\theta_e)A_{ab}(\theta_e)}{A_{bc}(\theta_e)}} \\ 2\sqrt{-\dfrac{A_{ab}(\theta_e)A_{bc}(\theta_e)}{A_{ca}(\theta_e)}} \\ 2\sqrt{-\dfrac{A_{bc}(\theta_e)A_{ca}(\theta_e)}{A_{ab}(\theta_e)}} \end{Bmatrix} = \begin{Bmatrix} A_a(\theta_e) \\ A_b(\theta_e) \\ A_c(\theta_e) \end{Bmatrix} \quad \text{Eq. 5}$$

The first, second, and third amplitude signals Za, Zb, and Zc correspond to amplitude profiles Aa, Ab, and Ac of the extracted currents iah, ibh, and ich for the A, B, and C axes, respectively. That is, the first, second, and third amplitude signals Za, Zb, and Zc represent the amplitudes of the first, second, and third extracted currents iah, ibh, and ich, respectively. The computation of Eq. 5 in the amplitude computation section 43 can be regarded as a reconstruction of signals representing the amplitudes. The first, second, and third amplitude signals Za, Zb, and Zc are inputted to the rotational position acquisition section 5.

In the rotational position acquisition section 5, the first, second, and third amplitude signals Za, Zb, and Zc for the A, B, and C axes are subjected to three- to two-phase transformation (i.e., ABC to $\alpha\beta$ transformation), just as are the first, second, and third filtered signals in the first preferred embodiment. As a result, an amplitude signal for the $\alpha$ axis and an amplitude signal for the $\beta$ axis are acquired. Then, using the amplitude signal for the $\alpha$ axis and the amplitude signal for the $\beta$ axis, a rotational position $\theta e$ of a rotating portion 12 is acquired (step S5). In the rotational position acquisition section 5, the rotational position $\theta e$ of the motor 1 is estimated with high precision based on the first, second, and third amplitude signals Za, Zb, and Zc in the above-described manner.

Incidentally, it is conceivable to use filtered signals obtained by subjecting signals representing the squares of the extracted currents to low-pass filtering to estimate the rotational position. This method, however, involves generation of higher harmonics in the filtered signals, imposing a certain limitation on the degree of precision with which the rotational position is estimated based on the filtered signals. It is also conceivable to use filtered signals obtained by subjecting signals representing the absolute values of the extracted currents to low-pass filtering to estimate the rotational position. This method, however, involves generation of noise caused by higher harmonics in the filtered signals, imposing a certain limitation on the degree of precision with which the rotational position is estimated.

In contrast to these methods, the method employed by the control apparatus 10 illustrated in FIG. 7 generates no, or limited, higher harmonics in the amplitude signals acquired using Eq. 5. This enables the rotational position of the rotating portion 12 to be detected with higher precision.

Note that each of the control apparatuses 10 described above can be modified in various manners.

For example, in the voltage supply section 2, HF injection signals for the A, B, and C axes may alternatively be generated and superimposed on LF control signals for the A, B, and C axes.

In the amplitude computation section 43 of the control apparatus 10 illustrated in FIG. 7, the amplitude signals may alternatively be acquired through a computation other than as expressed by Eq. 5. For example, the first, second, and third amplitude signals Za, Zb, and Zc may alternatively be acquired from the first, second, and third filtered signals Aab, Abc, and Aca through a computation expressed by Eq. 6 below.

$$\begin{Bmatrix} Z_a \\ Z_b \\ Z_c \end{Bmatrix} = \begin{Bmatrix} \dfrac{A_{ca}(\theta_e)A_{ab}(\theta_e)}{A_{bc}(\theta_e)} \\ \dfrac{A_{ab}(\theta_e)A_{bc}(\theta_e)}{A_{ca}(\theta_e)} \\ \dfrac{A_{bc}(\theta_e)A_{ca}(\theta_e)}{A_{ab}(\theta_e)} \end{Bmatrix} = \begin{Bmatrix} -\dfrac{1}{4}A_a^2(\theta_e) \\ -\dfrac{1}{4}A_b^2(\theta_e) \\ -\dfrac{1}{4}A_c^2(\theta_e) \end{Bmatrix} \quad \text{Eq. 6}$$

Also in this case, the rotational position $\theta e$ of the rotating portion 12 can be acquired with a relatively high degree of precision based on the first, second, and third amplitude signals Za, Zb, and Zc. The first, second, and third amplitude signals Za, Zb, and Zc as expressed by Eq. 6 can be considered to essentially represent the amplitudes of the first, second, and third extracted currents iah, ibh, and ich, respectively. However, when there is a particular desire for a reduction in a computational load on the control apparatus 10, it is preferable to acquire the rotational position without computing the amplitude signals, as is the case with the control apparatus 10 illustrated in FIG. 1.

Note that, although the control apparatus 10 described above is arranged to perform sensorless position detection and control of the motor 1, the capability of the control apparatus may alternatively be used to perform sensorless speed detection and control, or to perform sensorless initial position detection when, for example, the motor is to be activated with a large torque.

Note that the motor 1 may not be a permanent-magnet synchronous motor, but may alternatively be any other desirable motor having saliency, such as, for example, a synchronous reluctance motor.

Also note that features of the above-described preferred embodiments and the modifications thereof may be combined appropriately as long as no conflict arises.

Preferred embodiments of the present invention are applicable to control and estimation of the rotational position of various motors having saliency.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of estimating a rotational position of a motor having saliency, the method comprising the steps of:
    a) superimposing, on a drive voltage to rotate a rotating portion of the motor, a measuring voltage having a predetermined frequency higher than a frequency of the drive voltage to generate three-phase voltages, and supplying the three-phase voltages to a stationary portion of the motor;
    b) in parallel with step a), extracting components of the predetermined frequency in three-phase currents flowing in the stationary portion as first, second, and third extracted currents;
    c) multiplying the first and second extracted currents together to acquire a first composite signal, multiplying the second and third extracted currents together to acquire a second composite signal, and multiplying the first and third extracted currents together to acquire a third composite signal;
    d) subjecting the first, second, and third composite signals to low-pass filtering to acquire first, second, and third filtered signals, respectively, the low-pass filtering passing low-frequency components including the frequency of the drive voltage; and
    e) acquiring a rotational position of the rotating portion based on the first, second, and third filtered signals.

2. The method according to claim 1, wherein step e) includes:
    e1) acquiring a first amplitude signal representing an amplitude of the first extracted current, a second amplitude signal representing an amplitude of the second extracted current, and a third amplitude signal representing an amplitude of the third extracted current from the first, second, and third filtered signals; and
    e2) acquiring the rotational position of the rotating portion based on the first, second, and third amplitude signals.

3. The method according to claim 2, wherein in step e1), the first, second, and third amplitude signals are acquired according to an equation below:

$$\begin{Bmatrix} Z_a \\ Z_b \\ Z_c \end{Bmatrix} = \begin{Bmatrix} 2\sqrt{-\dfrac{A_{ca}(\theta_e)A_{ab}(\theta_e)}{A_{bc}(\theta_e)}} \\ 2\sqrt{-\dfrac{A_{ab}(\theta_e)A_{bc}(\theta_e)}{A_{ca}(\theta_e)}} \\ 2\sqrt{-\dfrac{A_{bc}(\theta_e)A_{ca}(\theta_e)}{A_{ab}(\theta_e)}} \end{Bmatrix}$$

where Za, Zb, and Zc denote the first, second, and third amplitude signals, respectively, Aab($\theta$e), Abc($\theta$e), and Aca($\theta$e) denote the first, second, and third filtered signals, respectively, and $\theta$e denotes the rotational position of the rotating portion.

4. A control apparatus of a motor having saliency, the control apparatus comprising:
    a voltage supply section arranged to superimpose, on a drive voltage to rotate a rotating portion of the motor, a measuring voltage having a predetermined frequency higher than a frequency of the drive voltage to generate three-phase voltages, and supply the three-phase voltages to a stationary portion of the motor;
    a current extraction section arranged to extract components of the predetermined frequency in three-phase currents flowing in the stationary portion as first, second, and third extracted currents;
    a composite signal acquisition section arranged to multiply the first and second extracted currents together to acquire a first composite signal, multiply the second and third extracted currents together to acquire a second composite signal, and multiply the first and third extracted currents together to acquire a third composite signal;
    a low-pass filtering section arranged to subject the first, second, and third composite signals to low-pass filtering to acquire first, second, and third filtered signals, respectively, the low-pass filtering passing low-frequency components including the frequency of the drive voltage; and
    a rotational position acquisition section arranged to acquire a rotational position of the rotating portion based on the first, second, and third filtered signals; wherein
    the voltage supply section is arranged to control a phase of the drive voltage based on the rotational position of the rotating portion.

* * * * *